Dec. 18, 1962 C. D. OWENS 3,068,496
HONEYCOMB UNCAPPING APPARATUS
Filed April 7, 1960 5 Sheets-Sheet 1

INVENTOR
CHARLES D. OWENS

BY *R. Hoffman*
ATTORNEY

Dec. 18, 1962 C. D. OWENS 3,068,496
HONEYCOMB UNCAPPING APPARATUS
Filed April 7, 1960 5 Sheets-Sheet 2

INVENTOR
CHARLES D. OWENS
BY
R. Hoffman
ATTORNEY

Dec. 18, 1962     C. D. OWENS     3,068,496
HONEYCOMB UNCAPPING APPARATUS
Filed April 7, 1960     5 Sheets-Sheet 3

INVENTOR
CHARLES D. OWENS

BY *R. Hoffman*

ATTORNEY

Dec. 18, 1962     C. D. OWENS     3,068,496
HONEYCOMB UNCAPPING APPARATUS
Filed April 7, 1960     5 Sheets-Sheet 4
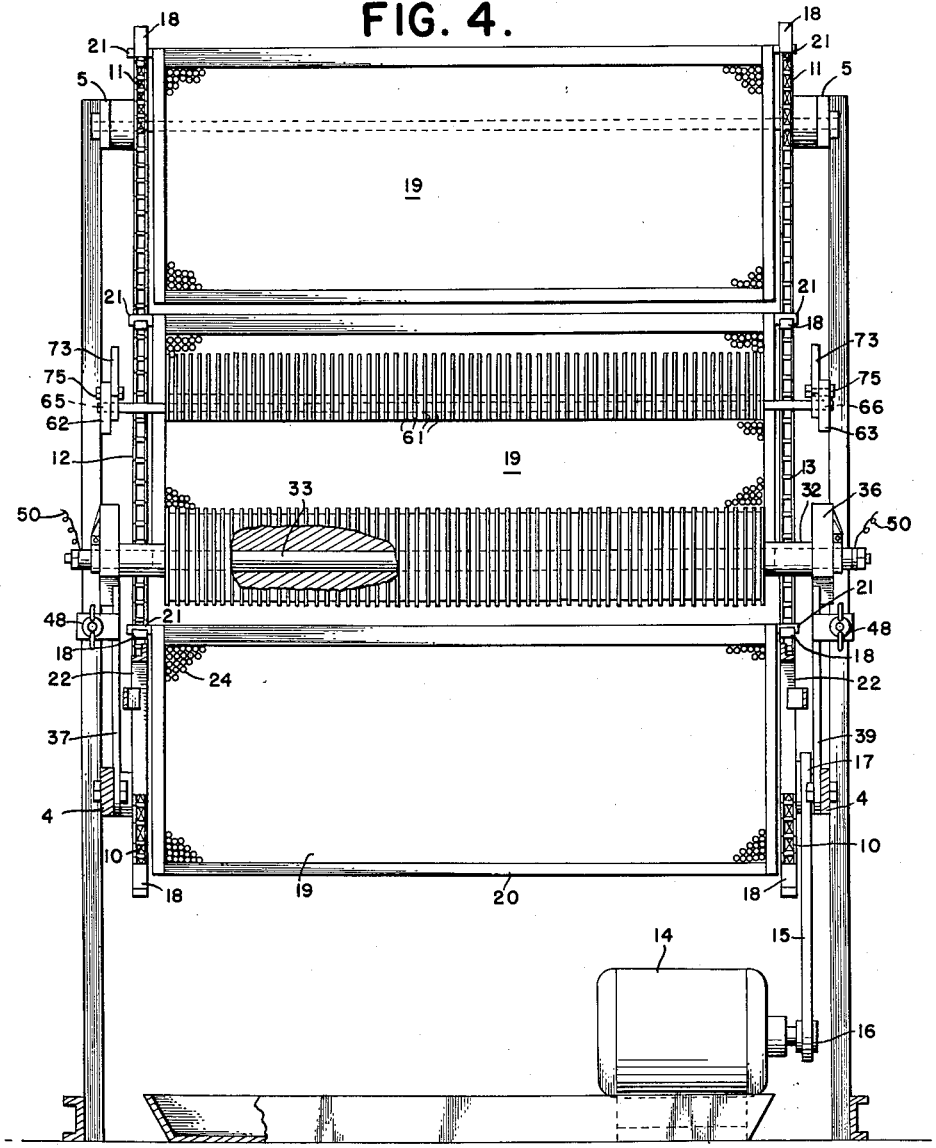
INVENTOR
CHARLES D. OWENS
BY R. Hoffman
ATTORNEY Dec. 18, 1962

C. D. OWENS 3,068,496

HONEYCOMB UNCAPPING APPARATUS

Filed April 7, 1960

INVENTOR
CHARLES D. OWENS

BY *R. Hoffman*

ATTORNEY

United States Patent Office 3,068,496
Patented Dec. 18, 1962

3,068,496
HONEYCOMB UNCAPPING APPARATUS
Charles D. Owens, Tucson, Ariz., assignor to the United States of America as represented by the Secretary of Agriculture
Filed Apr. 7, 1960, Ser. No. 20,793
9 Claims. (Cl. 6—12)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to apparatus for uncapping honeycomb so that the honey may be extracted. More particularly, the invention relates to apparatus whereby the wax closures of comb cells are punctured to permit drainage of the honey and whereby the drained comb may be recovered in a reusable form.

In accordance with the usual procedures, the bees are permitted to deposit their honey in an artificial comb which is supported in the hive by a thin rectangular wooden frame open on both its faces. As soon as an individual cell of the comb has been filled, the bee plugs up both ends of the cell with wax, and as soon as all of the cells in comb frame have been filled the latter is removed from the hive. To recover the honey it is necessary to remove the wax plugs or caps (to "uncap" the comb) from both faces of the comb so that the honey will drain from the cells in which it has been deposited by the bees.

The usual procedure for uncapping honeycomb is to slice off the caps by means of an electrically or steam heated hand knife, or by steam heated vibrating knives over which the comb is passed. An older apparatus, similar to a miniature hammer mill, comprised free swinging hammers which knocked off the caps as the comb was passed between the hammers. One advantage of the apparatus of the present invention resides in the minimization of damage to the comb which is inherent in the use of hammers and heated knives.

Accordingly, one object of the present invention is to provide an apparatus which will uncap honeycomb without damaging the comb whereby the latter may be reinserted into the hive for further collection of honey. Another object is to provide an apparatus which will operate in a continuous manner. Still another object is to provide an apparatus which will uncap honeycomb more rapidly than any other presently known devices.

These and other objects which will be apparent to those skilled in the art are accomplished by the apparatus of the present invention which is described below and in the accompanying drawings in which:

FIGURE 4 is a front elevation of the modification shown in FIGURE 3 taken on line 4—4 of FIGURE 3;

FIGURE 6 is a sectional side elevation of the scraper shown in FIGURE 5, taken on line 6—6 of FIGURE 5;

Figure 1:
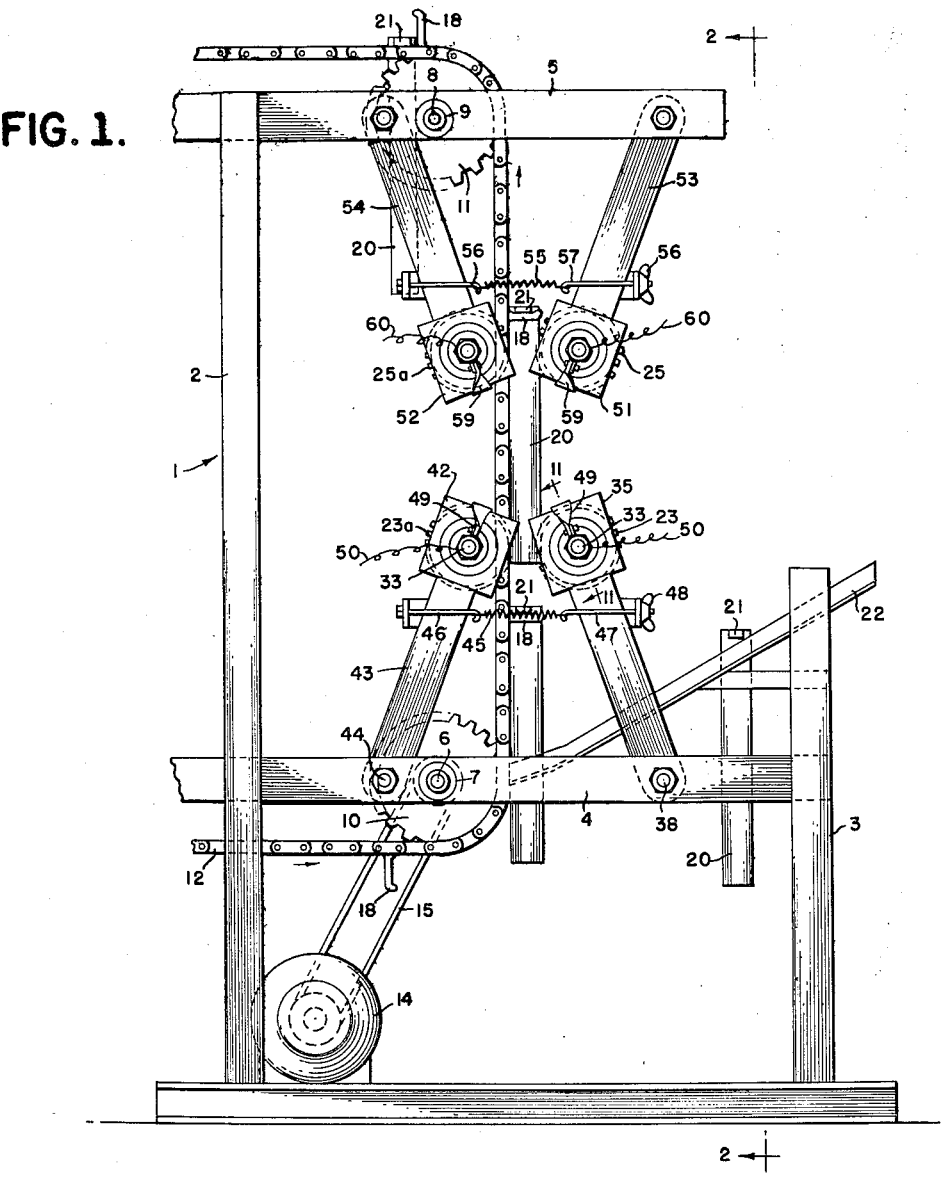
FIGURE 1 is a side elevation of one form of apparatus constructed in accordance with this invention showing the location of the uncapping elements.

In general, the objects of this invention are accomplished by means of a pair of heated toothed rollers which bear against both surfaces of a honeycomb as the latter moves between the rollers. The teeth on the roller are so placed that they will melt and puncture the wax caps on both faces of the comb. As the comb continues to travel past the rollers, both faces of the former are brought into contact with elements which roughen the surfaces of the comb. The purpose of roughening the surface will be explained below.

More particularly, the apparatus comprises a frame, designated generally as 1, having a rear vertical support member 2 and a front vertical support member 3, a pair of horizontal beams 4, and a second pair of horizontal beams 5. Both pairs of horizontal beams are rigidly secured to the rear of the frame and extend forward.

A shaft 6, journaled in bearings 7, is mounted between lower horizontal beams 4, and a second shaft 8, journaled in bearings 9, is mounted between upper horizontal beams 5. Shaft 8 is directly above shaft 6. Shaft 6 has a sprocket wheel 10 at each end, each of the wheels being keyed or otherwise rigidly secured to rotate with the shaft. Similarly, shaft 8 has a sprocket wheel 11 at each end, each of these wheels also being keyed or otherwise rigidly secured to rotate with the shaft. An endless sprocket chain 12 passes over sprocket wheels 10 and 11 on one side of the apparatus and a second endless sprocket chain 13 passes over the sprocket wheels on the right side. The sprocket wheels and chains are driven from any suitable source of power, as electric motor 14 mounted at the bottom of the frame, through belt 15 which passes over pulleys 16 and 17 on the motor shaft 18 and shaft 6, respectively.

Sprocket chains 12 and 13 serve to carry the honeycomb past the uncapping devices. Thus, as shown in FIGURES 1–4, fingers 18 are welded to the chains at suitable intervals. Honeycomb 19 is permanently supported in rectangular frame 20 which is provided at each end on the upper side with lugs 21. The frame 20 is shorter than the distance between the two parallel chains; but the lugs 21, which are attached to the upper side of the frame, extend beyond the frame for a distance sufficient to be engaged by fingers 18. Unopened honeycomb slides down guides 22 and remains suspended until a pair of fingers 18, continuously moving in the direction of the arrow, as shown in FIGURE 1, engage lugs 21, thereby suspending the frame and carrying the latter upward. The frame is pulled between a pair of similar uncapping rollers 23 and 23a one on each side of the frame, which bear against the surfaces 24 of the comb, thereby puncturing the wax caps, as described more fully below. As will be apparent from FIGURES 1 and 2, rollers 23 and 23a are freely rotatable. As the frame travels upward it is next engaged by a pair of scraping rolls 25 and 25a (FIGURES 1 and 2) or a bank of scraping fingers 26 and 26a (FIGURES 3 and 4), also described more fully below. As will be apparent from FIGURES 1 and 2, scraping rollers 25 and 25a are also freely rotatable. After passing between the scrapers, the suspended comb continues over the top of the apparatus to the rear thereof and is removed for recovery of the honey which can now be drained from the opened cells. A trough 27 is provided under the apparatus to collect any honey which drips out of the comb after it has been uncapped and while it is still in transit through the machine.

Figure 8:
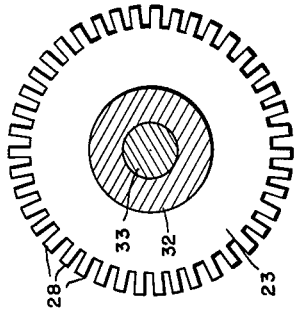
FIGURES 7 and 8 represent, on an enlarged scale, front and sectional side views, respectively, of the uncapping elements used in both of the modifications shown in FIGURES 1 and 3.
Figure 10:
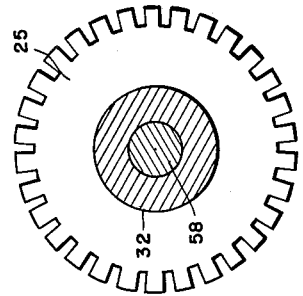
FIGURES 9 and 10 represent, on an enlarged scale, front and sectional side views, respectively, of the scraping elements used in the modification shown in FIGURE 1.
Figure 7:
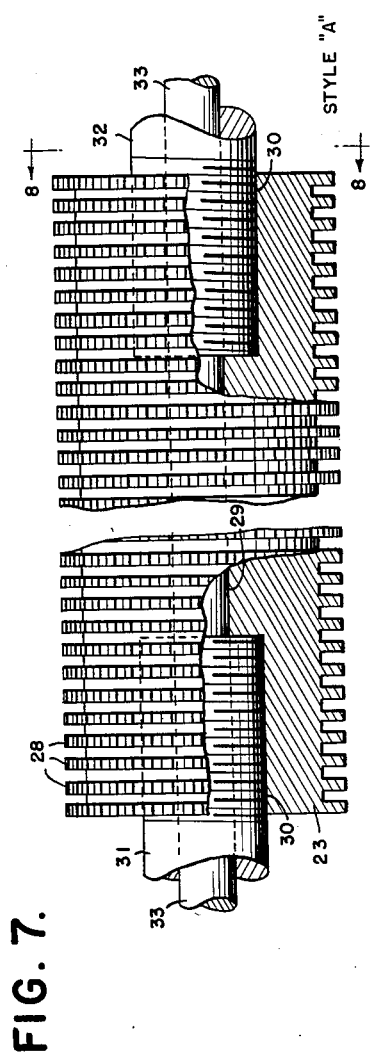

The uncapping operation is carried out by means of cylindrical rollers 23 (style "A"—FIGURES 7 and 8). These are made of aluminum or any other suitable metal which may be machined or cast to the desired dimensions. For best results, the length of the rollers should correspond to the length of the honeycomb surface. In the form here illustrated, the length of the roller was selected to be used with a standard Langstroth frame. Accordingly, for use with a standard frame, the roller is made slightly shorter than about 16¾ inches, with a 3 inch outside diameter. As shown in FIGURE 7, rows of teeth 28, about ¼ inch deep and ⅛ inch wide, are cut in the periphery of the roller. The style "A" roller in this instance has 77 rows of teeth, with 42 teeth per row. This number of teeth will open every cell in the surface of a honeycomb of standard size. It will, of course, be understood that the size of rollers and number of teeth can vary in accordance with the particular size honeycomb.

Figure 11:
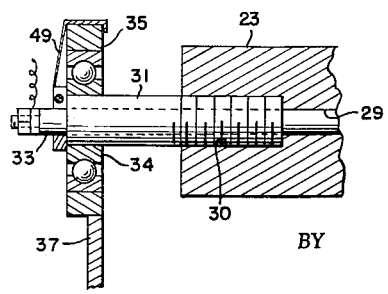
FIGURE 11 is a section taken on line 11—11 of FIGURE 1 showing, on an enlarged scale, the method of mounting the uncapping elements and for connecting the electrical heating units contained therein to a source of current.

The roller illustrated is provided with an axial hole 29 about ½ inch in diameter which extends the entire length of the roll, except for the portions at each end. Each end is enlarged to a depth of about 1⅞ inches and these enlarged ends are threaded to provide a 1¼ inch thread 30. Into the threaded ends there are screwed stub shafts 31 and 32. The stub shafts are each provided with a central bore of the same diameter as that through roller 23. A rod-shaped electrical resistance heater 33 is inserted through the stub shafts and through the roller and is long enough to protrude some distance from both ends of the shafts 31 and 32. Shaft 31 rotates in bearing 34 which is mounted in bearing block 35 and a similar bearing for shaft 32 is mounted on the other side in bearing block 36. Bearing block 35 is carried at the end of arm 37 which is pivoted to horizontal beam 4 of the frame by means of pivot bearing 38. A similar arm 39 and pivot bearing 40 are provided for block 36 on the other side. Pivot bearings 38 and 40 are located near the front of the frame so that roller 23 will contact the front face of honeycomb 19. Roller 23a which is similar to roller 23 is mounted, in the same manner as roller 23, to rotate in a pair of bearings 41 in rear bearing blocks 42 which are carried by arms 43. Arms 43 are also pivoted to the lower horizontal beams 4 by means of pivot bearings 44, but to the rear of the frame so that roller 23a contacts the rear face of the honeycomb. The two rollers, 23 and 23a, are maintained in pressure contact with the surfaces of the honeycomb by means of a spring 45 stretched between bolts 46 and 47. Tension in the spring is adjusted by means of wing nut 48. A similar spring is provided on the other side of the apparatus so that the pressure against the faces of the honeycomb may be adjusted to be uniform along the entire lengths of the rollers. The pressure of the rollers against the honeycomb is sufficient to cause the former to rotate as the frame is carried upward between them. To prevent the heaters 33 from rotating with the rollers, each heater is surrounded adjacent its ends by a clamp 49 which extends and bends over the top of the bearing block, as shown, for example, in FIGURE 11. The ends of the heaters are also connected by means of wires 50 to a suitable source of electrical energy (not shown). The heaters may be rated at from 750 to 1000 watts to provide sufficient heat to the rollers so that the teeth will melt the wax caps of the cells while not damaging the comb. In order to prevent damage due to overheating if the apparatus should be stopped while a honeycomb is between the uncapping rollers, a suitable resistance (not shown) may be provided to be readily connected in series with the heaters whereby the current flowing through the latter will be cut down sufficiently to prevent generation of excessively high temperatures.

As indicated above, the number of teeth on rollers 23 and 23a is selected so that each wax cap of each cell is opened. For the purpose of opening the cells and permitting drainage of the honey, the single pair of rollers is adequate. However, these rollers leave a smooth surface on both faces of the honeycomb. In order to reuse the comb in a hive and to induce the bees to refill the cells it is necessary that a rough surface be provided. To that end, means are provided beyond the uncapping rollers for the purpose of roughening the surfaces of the comb. Two modifications of such means are disclosed below.

Figure 2:
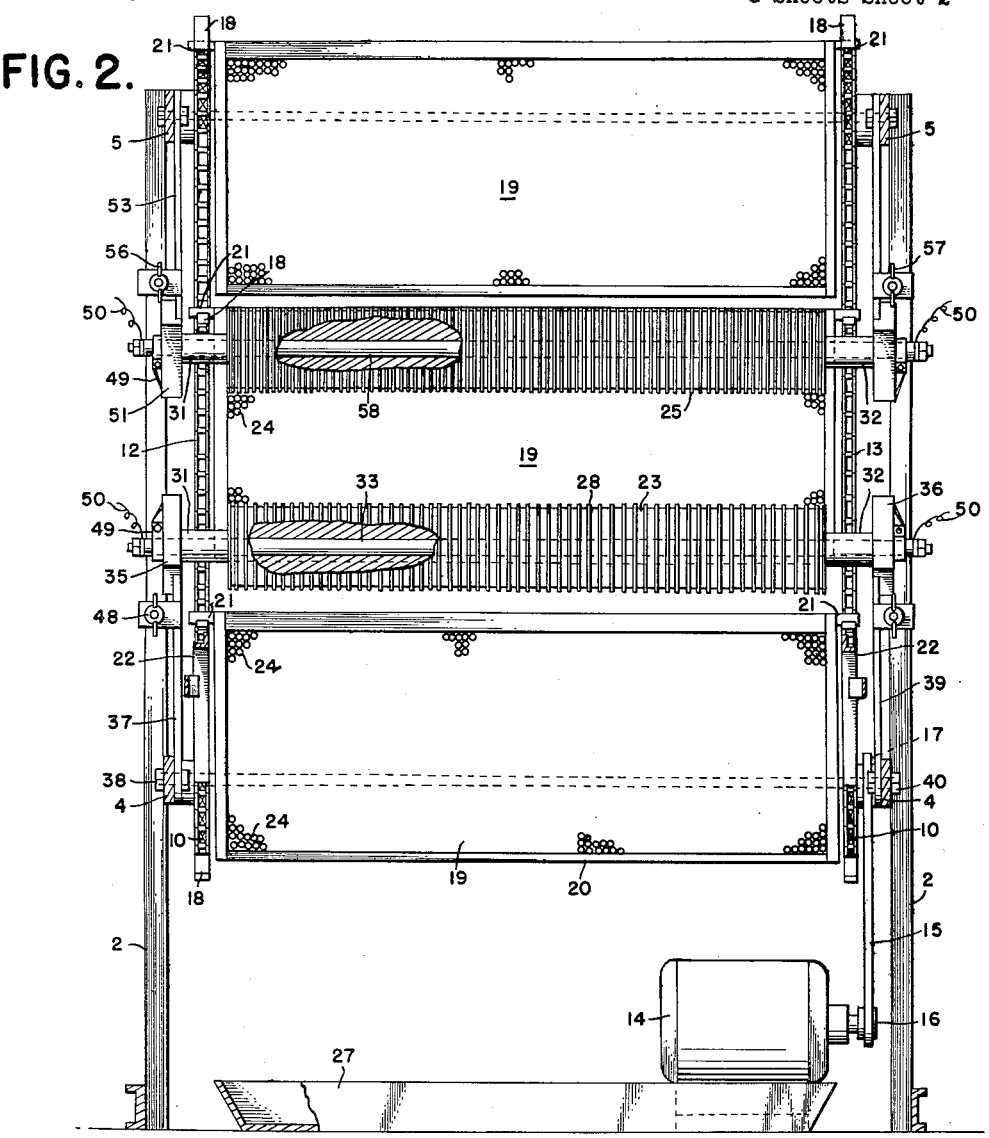
FIGURE 2 is a front elevation of the apparatus shown in FIGURE 1 taken on line 2—2 of FIGURE 1.

In the first modification, as shown in FIGURES 1 and 2, a second pair of rollers 25 and 25a is provided above the first pair, 23 and 23a. Scraping rollers 25 and 25a are identical. These are rotatably mounted in bearing blocks 51 and 52, which are smilar to bearing blocks 35 and 42, by means of stub shafts which are also similar to those used for the lower pair of rollers. The upper four bearing blocks are suspended from upper horizontal beams 5 on the frame by means of pivot arms 53 and 54 on the left side of the apparatus and an identical pair on the right side. These pivot arms are mounted to the frame by means of four pivot bearings, also similar to those used with the lower set of rollers, at such locations that the honeycomb, as it travels upward, will pass between rollers 25 and 25a, the latter contacting opposite faces of the comb. A pair of springs 55, one on each side of the apparatus, stretched between bolts 56 and 57 draw rollers 25 and 25a together in pressure contact with the surfaces of the honeycomb. Pressure is regulated by means of wing nuts 56 and 57.

Figure 9:
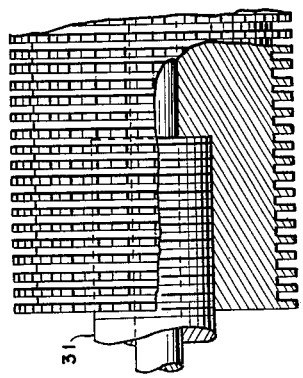

Scraping rollers 25 and 25a (style "B," FIGURE 9) are provided with teeth similar to those of the uncapping rollers except that the number of teeth is different. In the form herein disclosed, the style B roller was somewhat shorter than the uncapping roller (16.705 inches) and had 107 rows of teeth, with 30 teeth per row. As in the case of the uncapping roller, the diameter was 3 inches, and the scraping roller also had a ½ inch bore enlarged at both ends to a depth of 1⅞" to an internal diameter suitable for cutting a 1¼ inch thread.

It will, of course, be apparent, that the foregoing dimensions are merely illustrative and that they may be varied to suit any particular size honeycomb.

A rod-shaped electrical resistance heater 58, similar to heaters 33 in the uncapping rollers, is inserted into each of the scraping rollers and secured against rotation and falling out by means of clamps 59 which are similar to clamps 49 on the uncapping rollers. Wires 60 connect the heaters to a source of electrical energy (not shown) and, as in the case of heaters 33, the heaters may be provided with a disconnectable series resistance (not shown) for use in the event the apparatus stops with a honey comb between the rollers.

As a honeycomb is drawn upward between rollers 25 and 25a the combination of heat and pressure of the teeth melts the smooth surface of the wax thereby producing a rough texture which induces the bees to work on the honeycomb after it has been replaced in the hive.

In the second modification (FIGURES 3 and 4), the pair of rollers 25 and 25a is replaced with a pair of scraper units 26 and 26a comprising a plurality of scraper fingers 61.

In this modification an extra pair of horizontal beams 62 and 63 is added to the frame structure to mount the scraping units.

The scraping units are identically constructed and each comprises an elongated shaft 64 slightly longer than the distance between beams 62 and 63. Shaft 64 is supported by the beams by being inserted into holes 65 and 66 in said beams. Fingers 61 each have a scraping edge 67 at one end and a hole at the other end which is sufficiently large to pass the shaft 64 to permit the finger to rotate freely thereon. The fingers are separated from each other by spacing bushings 68 which are each provided with a radial slot 69 in one surface. Each finger is provided with a slot 70 in the edge opposite the scraping edge 67. One end of a spiral spring 71, having one or more turns around shaft 64, is inserted into slot 70 in one edge of the finger while the other end is inserted into hole 72 in the shaft. Access to hole 72 is provided by the radial slot 69 in bushing 68. The radial slot may be of any angle; 40° having been found suitable for the present purpose. As will be apparent, spring 71 urges the finger in the direction indicated by the arrow in FIGURE 6. A sufficient number of fingers is provided to span the length of the honeycomb.

Two sets of scraping fingers are provided, one on each side of the honeycomb. Scraping is accomplished by virtue of springs 71 which urge the fingers into contact with the comb surfaces.

To adjust the pressure of the scraping fingers against the comb surfaces, a plate 73 is welded to each end of shafts 64 and 64a adjacent beams 62 and 63. A slot 74, which is a portion of a circle having the same center as shaft 64 or 64a, is provided in each plate 73 and bolts 75 are passed through this slot and through holes in beams 62 and 63. With bolts 75 loosened, plates 73 are rotated until the desired pressure of fingers 61 against the comb surfaces is obtained and the bolts are then tightened to retain the plates in position.

In the particular form shown, the radius of plate 73 was 2⅜ inches, the slot 74 was ¼ inch wide, it had a radius of 2⅛ inches to the center thereof, and spanned an arc of 45°. It will be apparent, however, that the foregoing dimensions may be altered to suit any particular situation without departing from the invention.

Figures 3, 5:
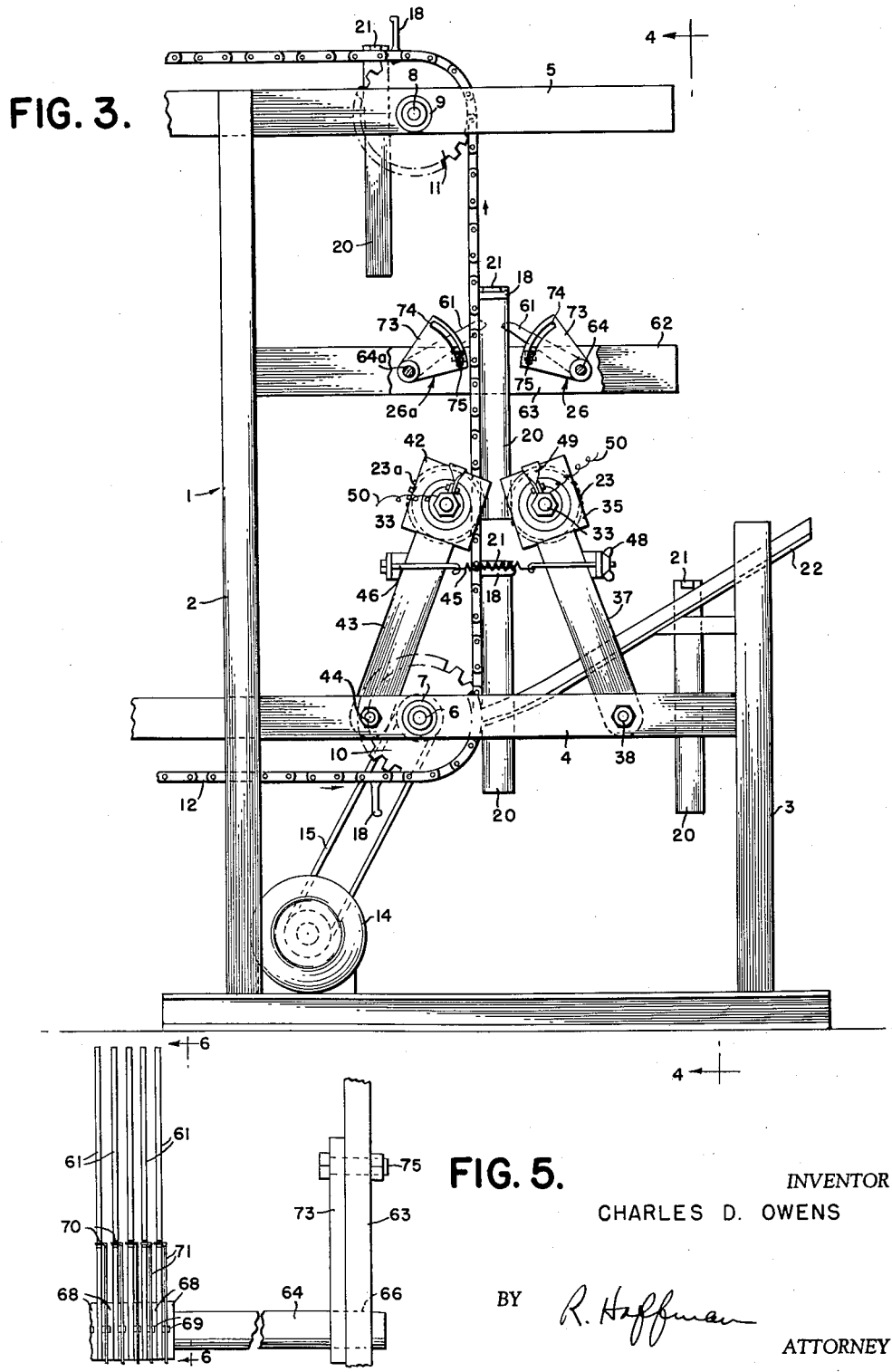
FIGURE 3 represents a side elevation of a modification of the apparatus shown in FIGURE 1.
FIGURE 5 is a front elevation detail, on an enlarged scale, of the scraping element (described below) used in the modification shown in FIGURE 3.

As in the case of the roller-type scraper, the scrapers of FIGURES 3 and 4 roughen the surfaces of the honeycomb sufficiently to induce the bees to work on the latter. After the surfaces have been roughened, the honeycomb continues its passage over the top of the apparatus to the rear thereof where it is removed for subsequent handling.

I claim:

1. Apparatus for uncapping honeycomb comprising a pair of freely rotatable hollow rollers, heating means inside each of the rollers, a plurality of teeth on the outer surface of each of said rollers, means for transporting honeycomb having opposite sides coated with wax between said pair of rollers, means for maintaining each of the pair of rollers in rotational and pressure contact with a surface of the honeycomb, and a pair of scraping means beyond said pair of rollers in the direction of travel of the honeycomb so disposed that each of said pair of scraping means is in scraping engagement with a surface of said honeycomb.

2. Apparatus for uncapping honeycomb comprising a first pair of freely rotatable hollow rollers, heating means inside each of the rollers, a plurality of teeth on the outer surface of each of said rollers, means for transporting honeycomb having opposite sides coated with wax between said pair of rollers, means for maintaining each of the pair of rollers in rotational and pressure contact with a surface of the honeycomb, a second pair of freely rotatable hollow rollers beyond said first pair of rollers in the direction of travel of the honeycomb so disposed that each of said second pair of rollers is adjacent to a surface of the honeycomb, heating means inside each of said second pair of rollers, a plurality of teeth on the outer surface of each of second pair of rollers, and means for maintaining each of said second pair of rollers in rotational and pressure contact with a surface of the honeycomb.

3. The apparatus of claim 2 wherein the teeth on each of the first pair of rollers are so arranged longitudinally and circumferentially on said rollers and are of sufficient number to melt and puncture the wax coating of the cells of the honeycomb and the number of teeth on each of the second pair of rollers is different from the number of teeth in the first pair.

4. Apparatus for uncapping honeycomb comprising a pair of freely rotatable hollow rollers, heating means inside each of rollers, a plurality of teeth on the outer surface of each of said rollers, means for transporting honeycomb having opposite sides coated with wax between said pair of rollers, means for maintaining each of the pair of rollers in rotational and pressure contact with a surface of the honeycomb, a plurality of scraping fingers beyond said pair of rollers in the direction of travel of the honeycomb adjacent each surface of the honeycomb, and means for maintaining said fingers in scraping engagement with the surfaces of the honeycomb.

5. The apparatus of claim 4 wherein the teeth on each of the rollers are so arranged longitudinally and circumferentially on said rollers and are of sufficient number to melt and puncture the wax coating of the cells of the honeycomb.

6. Apparatus for uncapping honeycomb comprising a supporting structure, means for transporting honeycomb having opposite sides coated with wax through the apparatus, hollow freely rotatable rollers, possessing a number of teeth arranged longitudinally and circumferentially on said rollers to melt and puncture the wax coating on the cells in the honeycomb, mounted on said supporting structure on each side of the transporting means, heating means inside each of said rollers, means for maintaining said rollers in rotational and pressure contact with the surfaces of the honeycomb, and scraping means also mounted on said supporting structure on each side of the transporting means beyond the rollers in the direction of travel of the honeycomb.

7. Apparatus for uncapping honeycomb comprising a supporting structure, means for transporting honeycomb having opposite sides coated with wax through the apparatus, a first pair of hollow freely rotatable rollers, each possessing a number of teeth arranged longitudinally and circumferentially on said rollers to melt and puncture the wax coatings on the cells in the honeycomb, mounted on said supporting structure on opposite sides of the transporting means, heating means inside each of said rollers, means for urging each of said first pair of rollers into rotational and pressure contact with opposite surfaces of the honeycomb, a second pair of hollow freely rotatable rollers, each possessing a number of teeth different from the number of teeth on the first pair of rollers, mounted on the supporting structure on opposite sides of the transporting means beyond the first pair of rollers in the direction of travel of the honeycomb, heating means inside each of said second pair of rollers, and means for urging each of said second pair of rollers into rotational and pressure contact with opposite surfaces of the honeycomb.

8. Apparatus for uncapping honeycomb comprising a supporting structure, means for transporting honeycomb having opposite sides coated with wax through the apparatus, a pair of hollow freely rotatable rollers, each possessing a number of teeth arranged longitudinally and circumferentially on said rollers to melt and puncture the wax coatings on the cells in the honeycomb, mounted on said supporting structure on opposite sides of the transporting means, heating means inside each of the rollers, means for urging each of said rollers into rotational and pressure contact with opposite surfaces of the honeycomb, a row of scrapers also mounted on the supporting structure on opposite sides of the transporting means, each row comprising a plurality of scraping fingers, beyond the pair of rollers in the direction of travel of the honeycomb, and means for maintaining said fingers in scraping engagement with opposite surfaces of the honeycomb.

9. Apparatus for uncapping honeycomb comprising a pair of freely rotatable hollow rollers, heating means inside each of the rollers, a plurality of teeth on the outer surface of each of said rollers, means for transporting honeycomb having opposite sides coated with wax between said pair of rollers, and means for maintaining each of the pair of rollers in rotational and pressure contact with a surface of the honeycomb.

References Cited in the file of this patent

UNITED STATES PATENTS

| | | |
|---|---|---|
| 731,701 | Miller | June 23, 1903 |
| 890,397 | Avant | June 9, 1908 |
| 1,992,058 | Chrysler | Feb. 19, 1935 |
| 2,272,808 | McFadyen | Feb. 10, 1942 |
| 2,580,397 | Bogenschutz | Jan. 1, 1952 |
| 2,807,034 | Fox | Sept. 24, 1957 |

FOREIGN PATENTS

| | | |
|---|---|---|
| 460,358 | Canada | Oct. 18, 1949 |